US007554056B2

(12) United States Patent
Huismann et al.

(10) Patent No.: US 7,554,056 B2
(45) Date of Patent: *Jun. 30, 2009

(54) METHOD AND APPARATUS FOR BRAKING AND ADVANCING A WELDING WIRE

(75) Inventors: Gerd Huismann, Hamburg (DE); Peter Hennecke, Am Silberg (DE)

(73) Assignee: Illinois Tool Works Inc., Glenview, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 11/548,403

(22) Filed: Oct. 11, 2006

(65) Prior Publication Data

US 2007/0131665 A1  Jun. 14, 2007

Related U.S. Application Data

(63) Continuation of application No. 11/107,126, filed on Apr. 15, 2005, now abandoned, which is a continuation of application No. 10/200,863, filed on Jul. 23, 2002, now Pat. No. 6,984,806.

(51) Int. Cl.
*B23K 9/12* (2006.01)
(52) U.S. Cl. .................................. 219/137.71
(58) Field of Classification Search ............ 219/137.71, 219/130.21, 130.31, 130.32, 130.33, 130.51, 219/137 PS, 137.7
See application file for complete search history.

(56) References Cited

U.S. PATENT DOCUMENTS 1,563,612 A   12/1925   Cutler et al.
1,927,896 A    9/1933   Miller
(Continued)

FOREIGN PATENT DOCUMENTS

DE           3200421         7/1983
(Continued)

OTHER PUBLICATIONS

Energy based synergic pulse MIG control system Trends in Welding Research (2002) Pine Mountain U.S.A. Gerd Huismann.
(Continued)

*Primary Examiner*—Tu B Hoang
*Assistant Examiner*—Stephen J Ralis
(74) *Attorney, Agent, or Firm*—George R. Corrigan (57) ABSTRACT

A method and apparatus for providing welding-type power include a wire feeder that provides wire to an arc and a power supply that provides power to the arc. A reversible wire feed motor moves the wire to and away from the arc. A controller controls the reversible wire feeder motor to reverse at least once per process cycle, and/or controls the power source to provide a desired mean arc current, and/or controls the reversible motor in response to short detection and short clearing, and/or controls the reversal frequency in response to pool oscillation frequency. A wire feed motor output is slaved to an average of the reversible motor output. The controller may include various control modules, such as a mean arc current control module, and/or a short detection feedback circuit. The reversible motor is a stepper motor, that incrementally turns in a series of steps having a given angle in another embodiment. The controller includes a step size output and the given angle is varied in response to the step size output.

17 Claims, 5 Drawing Sheets

U.S. PATENT DOCUMENTS

| | | | |
|---|---|---|---|
| 2,079,956 A | 5/1937 | Burgett | |
| 2,886,696 A | 5/1959 | Tuthill et al. | |
| 3,053,975 A | 9/1962 | Nelson et al. | |
| 3,139,506 A | 6/1964 | Lothar et al. | |
| 3,249,276 A | 5/1966 | VanBergen et al. | |
| 3,339,057 A | 8/1967 | Bernard et al. | |
| 3,344,305 A | 9/1967 | Ogden | |
| 3,581,053 A | 5/1971 | Manz | |
| 3,586,221 A | 6/1971 | Rosen | |
| 3,630,425 A | 12/1971 | Wilkens | |
| 3,693,858 A | 9/1972 | Araya et al. | |
| 3,731,049 A | 5/1973 | Kiyohara et al. | |
| 3,975,616 A | 8/1976 | Siktberg et al. | |
| 4,125,759 A | 11/1978 | Kiyohara et al. | |
| 4,142,085 A | 2/1979 | Knipstrom et al. | |
| 4,159,410 A | 6/1979 | Cooper | |
| 4,218,906 A | 8/1980 | Yoshida | |
| 4,288,682 A | 9/1981 | Toth | |
| 4,301,355 A | 11/1981 | Kimbrough et al. | |
| 4,441,012 A | 4/1984 | Risbeck et al. | |
| 4,553,018 A | 11/1985 | Kondo et al. | |
| 4,717,807 A | 1/1988 | Parks et al. | |
| 4,780,594 A | 10/1988 | Rothermel | |
| 4,835,360 A | 5/1989 | Parks et al. | |
| 4,866,247 A | 9/1989 | Parks et al. | |
| 4,897,523 A | 1/1990 | Parks et al. | |
| 4,954,691 A | 9/1990 | Parks et al. | |
| 4,972,064 A | 11/1990 | Stava | |
| 5,001,326 A | 3/1991 | Stava | |
| 5,003,154 A | 3/1991 | Parks et al. | |
| 5,148,001 A | 9/1992 | Stava | |
| 5,272,313 A | 12/1993 | Karino | |
| 5,412,175 A | 5/1995 | Shimogama | |
| 5,473,139 A * | 12/1995 | Matsui et al. | 219/130.51 |
| 5,540,371 A | 7/1996 | Gilliland | |
| 5,643,479 A | 7/1997 | Lloyd et al. | |
| 5,742,029 A | 4/1998 | Stava et al. | |
| 5,961,863 A | 10/1999 | Stava | |
| 5,973,291 A | 10/1999 | Kramer et al. | |
| 6,008,470 A | 12/1999 | Zhang et al. | |
| 6,051,810 A | 4/2000 | Stava | |
| 6,160,241 A | 12/2000 | Stava et al. | |
| 6,201,216 B1 | 3/2001 | Mumaw | |
| 6,297,473 B2 | 10/2001 | Hiraoka et al. | |
| 6,313,437 B1 | 11/2001 | Soting et al. | |
| 6,326,591 B1 | 12/2001 | Hutchison et al. | |
| 6,472,634 B1 | 10/2002 | Houston et al. | |
| 6,512,200 B2 | 1/2003 | Norrish et al. | |
| 6,568,578 B1 | 5/2003 | Kensrue | |
| 6,624,388 B1 | 9/2003 | Blankenship et al. | |
| 6,627,850 B1 | 9/2003 | Koga et al. | |
| 6,831,251 B1 | 12/2004 | Artelsmair et al. | |
| 6,963,048 B2 | 11/2005 | Huismann | |
| 6,969,823 B2 | 11/2005 | Huismann et al. | |
| 6,984,806 B2 | 1/2006 | Huismann et al. | |

FOREIGN PATENT DOCUMENTS

| | | |
|---|---|---|
| DE | 3827508 | 2/1990 |
| DE | 3936532 | 5/1990 |
| DE | 4118208 | 11/1991 |
| DE | 4204661 | 6/1993 |
| DE | 19738785 | 4/1999 |
| EP | 0313232 | 4/1989 |
| EP | 0320397 | 6/1989 |
| GB | 2002667 | 2/1979 |
| GB | 2120692 | 12/1983 |
| JP | 56-9062 | 1/1956 |
| JP | 60-108176 | 6/1960 |
| JP | 60-180675 | 9/1985 |
| JP | 11-226734 | 8/1999 |
| JP | 11-267839 | 10/1999 |
| SU | 1743752 | 6/1992 |
| WO | WO 95/03440 | 12/1995 |
| WO | WO 00/64620 | 11/2000 |
| WO | WO 01/38034 | 5/2001 |
| WO | WO 03/101658 | 12/2003 |

OTHER PUBLICATIONS

Advantages in using the stick out for increasing the burn off rate in gas metal arc welding. Gerd Huismann, $7^{th}$ International Symposium of Japan Welding Society (2001) Kobe Japan.

Energy based control system for the GMA welding process, G. Huismann.

Introduction of a new MIG process Advantages and Possibilities, Gerd Huismann.

Gas Metal Arc Welding for th $21^{st}$ Century, Grosvenor Resort Hotel, Orlando, Florida, USA Dec. 6-8, 2000, Gerd Huismann.

Controlled MIG Short Circuiting Process For Hyperbaric Applications, Gerd Huismann.

Feed Mechanisms For Micro-Arc and Vibro-Arc Metal Deposition, People's Republic of Bulgaria, Avt. Svarka, No. 2, pp. 68-70, 1968, A.M. Naidenov.

Mechanical Control of The Transfer Of Electrode Metal, People's Republic Of Bulgaria Avt. Svarka No. 12 pp. 31-33, 1969, A.M. Naidenov.

An Electrode Vibrator For Vibro-Arc Hardfacing Svar. Proiz, No. 5, pp. 40-41, 1966, A.A, Spiridonov.

Controlling The Arc Welding Process By Programming the Electrode Wire Feed Rate, Avt. Svarka, No. 1, pp. 1-5 and p. 15, 1977, B.E. Paton et al.

Calculation of the speed of Movement of the electrode Tip During Welding With mechanical Control of Metal Transfer, Avt. Svarka, No. 2, pp. 7-9, 1979, V.P. Dmitrienko.

Electromagnetic Mechanisms For the Pulse feed of Welding wire, Avt. Svarka, No. 1, pp. 46-49, 1980, N.M. Voropai, O.N. Savel'ev and S.S. Smergeev.

Power Calculation of the process of separation of an electrode metal droplet under the effect of an external electromagnetic field pulse, Avi. Svarka, No. 6, pp. 21-25, 1984, N.M. Tarason.

Developmnt of a precision wire feeder for small-diameter wire, Abstract, Eldon D. Brandon.

Direct Control Of The Material Transfer: The Controlled Short Circuiting (CSC)—MIG Process, G. Huismann.

Miller® The Power of Blue Invision® 456P And Phoenix 456 CC/CV (230/460 And 575 Volt Models) Feb. 2001.

Miller® The Power of Blue XR™ Control XR™ Air- And Water-Cooled Guns Mar. 2001.

* cited by examiner

METHOD AND APPARATUS FOR BRAKING AND ADVANCING A WELDING WIRE

RELATED APPLICATIONS

This is a continuation of, and claims the benefit of the filing date of, U.S. patent application Ser. No. 11/107,126, filed on Apr. 15, 2005, which is a continuation of U.S. patent application Ser. No. 10/200,863, filed Jul. 23, 2002, entitled Method and Apparatus For Retracting and Advancing a Welding Wire, which issued as U.S. Pat. No. 6,984,806 on Jan. 10, 2006.

FIELD OF THE INVENTION

The present invention relates generally to the art of welding. More specifically, it relates to welding using a short circuit process.

BACKGROUND OF THE INVENTION

There are many different arc welding processes used for numerous welding applications. While different processes share some characteristics, such as using an electric arc and/or current flow to provide the heat for the weld, different processes have characteristics that render them desirable for particular applications.

MIG welding is a widely used process that gives high heat input into the wire electrode and the workpiece, and thus can give high deposition rates. However, the process can be unstable and control of the arc length can be difficult. The MIG process is often performed as a short circuit welding.

Another known welding process is called controlled short circuit welding, or short circuit welding. Short circuit welding is often performed as a MIG process. Generally, short circuit welding includes a short circuit state, wherein the welding wire is touching the weld pool thus creating a short circuit, and an arc state, wherein an arc is formed between the welding wire and the weld pool. During the arc state the wire melts, and during the short circuit state the molten metal is transferred from the end of the wire to the weld puddle.

Disadvantages of short circuit welding relate to the transitions between states, and instability of the process. Transition from the short circuit state to the arc state was typically caused by providing sufficient current to "pinch" off a droplet. The pinching off at high current can result in a violent disintegration of the molten metal bridge producing excessive weld spatter. Instability also results from the weld pool being pushed away.

Many attempts in the prior art were made to create a stable short circuit welding power supply, such as those shown in U.S. Pat. Nos. 4,717,807, 4,835,360, 4,866,247, 4,897,523, 4,954,691, 4,972,064, 5,001,326, 5,003,154, 5,148,001, 5,742,029, 5,961,863, 6,051,810 and 6,160,241. These patents generally disclose complicated control schemes that fail to control the process to provide a stable and effective weld. They include control schemes that try to control the deposition of material and/or predict or cause a transition to the subsequent state based on the total energy put into the weld, the length of the stick out, total watts, time of the preceding state, etc.

These schemes share a common failure: they attempt to control both the energy of the weld and the transition between states using output current or power. This necessarily entails a sacrificing of one control goal (either energy to the weld or state transition) for the sake of the other. The net result is that the control schemes do not perform well at either controlling the energy into the weld or controlling the transition.

Another short circuit welding control system is disclosed in U.S. Pat. No. 6,326,591. This system adequately controls the energy into the weld, but it does not provide independent control of the transitions between states.

The present inventors have published descriptions of a controlled short circuit welding process where mechanical movement of the wire (advancing and retracting) is used to control the transition between welding states. The short circuit state is entered by advancing the wire until the wire touches the weld pool. The arc state is entered by retracting the wire until the wire does not touch the weld pool, and an arc forms. This system allows a typical output control to be used to control the energy delivered to the weld. By separating control of the transitions from control of energy, the system allows for better control of each.

A controlled short circuit welding system requires the capability of advancing and retracting the wire. The inventors have disclosed in the literature the use of a stepper motor to control the wire movement. A stepper motor adequately provides for short term advancing and retracting of the wire.

However, a stepper motor does not necessarily provide adequate feeding of the wire over the long term. Accordingly, a system that provides for advancing and retracting of the wire, and long term feeding of the wire, is desirable.

One problem with controlled short circuit welding arises when the wire is retracted. The wire from the source is feeding toward the weld, and has momentum in that direction. The retracting motor moves the wire in the opposite direction. With nothing to compensate for the opposing forces, the wire might not feed in a smooth and efficient manner. Accordingly, a controlled short circuit welder that compensates for the reversal of the wire is desirable.

Another problem with controlled short circuit welding is that the prior art has not fully taken advantage of the process control made possible by the mechanical control of the state transitions. Thus, a controlled short circuit welder that provides for electrical control of the arc for the purpose of controlling heat into the weld, and not for causing transitions from one state to another, is desirable.

The prior art has not adequately addressed the needs of short circuit welding at lower currents with thicker wires. The difficult to implement control schemes, in particular, make it difficult to weld with thicker wire, such as 2.4 mm diameter wire, e.g., at low currents, such as less than 100 amps. Accordingly, a controlled short circuit welding process that may be used at low currents relative to the wire diameter is desirable.

SUMMARY OF THE PRESENT INVENTION

According to a first aspect of the invention a welding-type power source, or a method of welding, includes a wire feeder that provides wire to an arc and a power supply that provides power to the arc. A reversible wire feed motor moves the wire to and away from the arc. A controller controls the reversible wire feeder motor to reverse at least once per process cycle, and/or controls the power source to provide a desired mean arc current, and/or controls the reversible motor in response to short detection and short clearing, and/or controls the reversal frequency in response to pool oscillation frequency.

According to a second aspect of the invention a welding system, or a method of welding, includes a wire feeder having a wire feed motor for providing wire to the arc and a power supply that provides power to the arc. A reversible wire feed motor moves the wire to and away from the arc whereby movement of the wire is superimposed onto the movement of the wire from the wire feed motor. A controller controls the power, the reversible wire motor, and the wire feed motor output is slaved to an average of the reversible motor output.

The controller includes various control modules, such as a mean arc current control module, and/or a short detection feedback circuit, in alternative embodiments.

A wire feed motor that moves the wire to the arc is included in one embodiment. The reversible motor superimposes movement of the wire onto the movement from the wire feed motor, and/or controls the wire feed motor to feed wire at an average speed of the reversible motor.

A buffer is between the wire feed motor and the reversible motor, and the controller receives feedback from the buffer, and controls the wire feed motor in response thereto in another embodiment.

The reversible motor is a stepper motor that incrementally turns in a series of steps having a given angle in another embodiment. The controller includes a step size output and the given angle is varied in response to the step size output.

The controller includes a frequency module is responsive to at least one control parameter, such as pool oscillation frequency in one alternative embodiment.

Other principal features and advantages of the invention will become apparent to those skilled in the art upon review of the following drawings, the detailed description and the appended claims.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system using particular components, it should be understood at the outset that the invention may also be implemented with other systems, components, and modules, and be used in other environments.

Generally, the present invention is a method and apparatus for controlled short circuit welding that includes mechanical control of transitions between the arc and short circuit states. In one embodiment the process includes a pulse mode. Control of energy to the weld is effected using the output current or voltage magnitude, wave shape, time, etc. Thus, the transitions are caused to occur, and current can be coordinated with, the transitions to reduce spatter, instability, or other undesirable features, by, for example, changing the current as the transition occurs, or in anticipation of the transition.

Mechanical control of the states is performed by advancing and retracting the wire at the arc. An advance followed by a retraction defines one process cycle. (Process cycle, as used herein, includes one cycle of the states of the process such as an arc state followed by a short circuit state, or an arc state, followed by a short circuit state, followed by a pulse state, etc.) The advancing and retracting are, in the preferred embodiment, accomplished using a pair of motors disposed on either side of the wire, opposite one another and near (or mounted on) the torch. The motors are, in various embodiments stepper motors, servo motors, planetary drive motors, zero backlash motors, gearless motors, or replaced with a linear actuator. The pair is disposed one after the other in one embodiment.

Stepper motors are used in the preferred embodiment, and the number, and angle or size of the step is controlled to control the length of wire advanced or retracted.

The preferred embodiment includes a wire feed motor mounted near the source of wire, such as a reel of wire, that drives the wire to the torch (although other embodiments omit this motor). As the reversible motors retract the wire (and the wire feed motor continues to feed the wire) a buffer is provided to account for the increase in wire between the wire feed motor and the reversible motors. Similarly, when the reversible motors advance the wire, wire is withdrawn from the buffer. The reversible motors move the end of the wire in addition to the movement from the wire feed motor, or they superimpose motion onto motion imposed by the wire feed motor. The speed of the wire feed motor is slaved to the average speed of the reversible motors, so that, on average, they both drive the same length of wire, in the preferred embodiment.

The buffer may be anything that stores and returns the extra wire, or provides an increased wire path length between the source and the torch. The buffer of the preferred embodiment includes a wire liner about the wire for at least a portion of the distance from the source to the torch. The liner is disposed in a tube that is wider, and the liner can bend and flex within the tube, thus increasing the length of wire/in a given length of tube. The tube is mounted to a hollow shaft, and the wire passes through the shaft. The shaft is fixed in one position. Thus, as the wire is retracted, the wire moves relative to the tube and shaft (or the tube and shaft may be said to move relative to the wire). The shaft could be mounted to slide along the axis of the wire, and thus move relative to the tip of the torch, thereby increasing the length of the wire path between the tip (arc end) of the torch and the wire source end of the torch.

Alternatively, the liner may be mounted to the shaft, and the wire moves relative to the liner. The liner is compressible, such as a coil spring, so that as the wire retracts, the spring compresses, in the preferred embodiment. Sensors may be provided that sense the amount of wire in the buffer, or the tension of the wire, and the process controlled (average wire feed speed e.g.) may be controlled in response thereto.

A controller is provided that causes the motors to reverse at least once per process cycle in the preferred embodiment, and controls the current output based on mean arc current (average current during the arc state only, or a function thereof), power, energy, voltage, or other welding output parameters. Feedback may include one or more of short detection, buffer feedback, tension feedback, pool oscillation, in addition to traditional welding parameters. Alternatives include reversing less frequently than once per cycle. One alternative provides for repeated reversals during the weld (i.e., not merely at the conclusion of the weld), but not once per cycle.

For example, the braking at the end of the arc cycle can feed forces between wire and droplet, which may disrupt the liquid bridge without retracting action. This is particularly present with lower wire diameters and higher short circuiting frequencies. The droplet has the speed of the wire before braking. This kinetic energy can be enough for disrupting the liquid path. In this case, no retracting is needed.

The control may include controlling heat, penetration and/or bead formation by controlling the advancement of the wire into the weld pool. The relative time in arc state and short state (arc balance) may be set by the user (as may be the time in the pulse state if it is used). Control of parameters such as polarity (balance), gas mixtures etc. may be done in coordination with the relative arc/short times (or other parameters).

Figure 1:
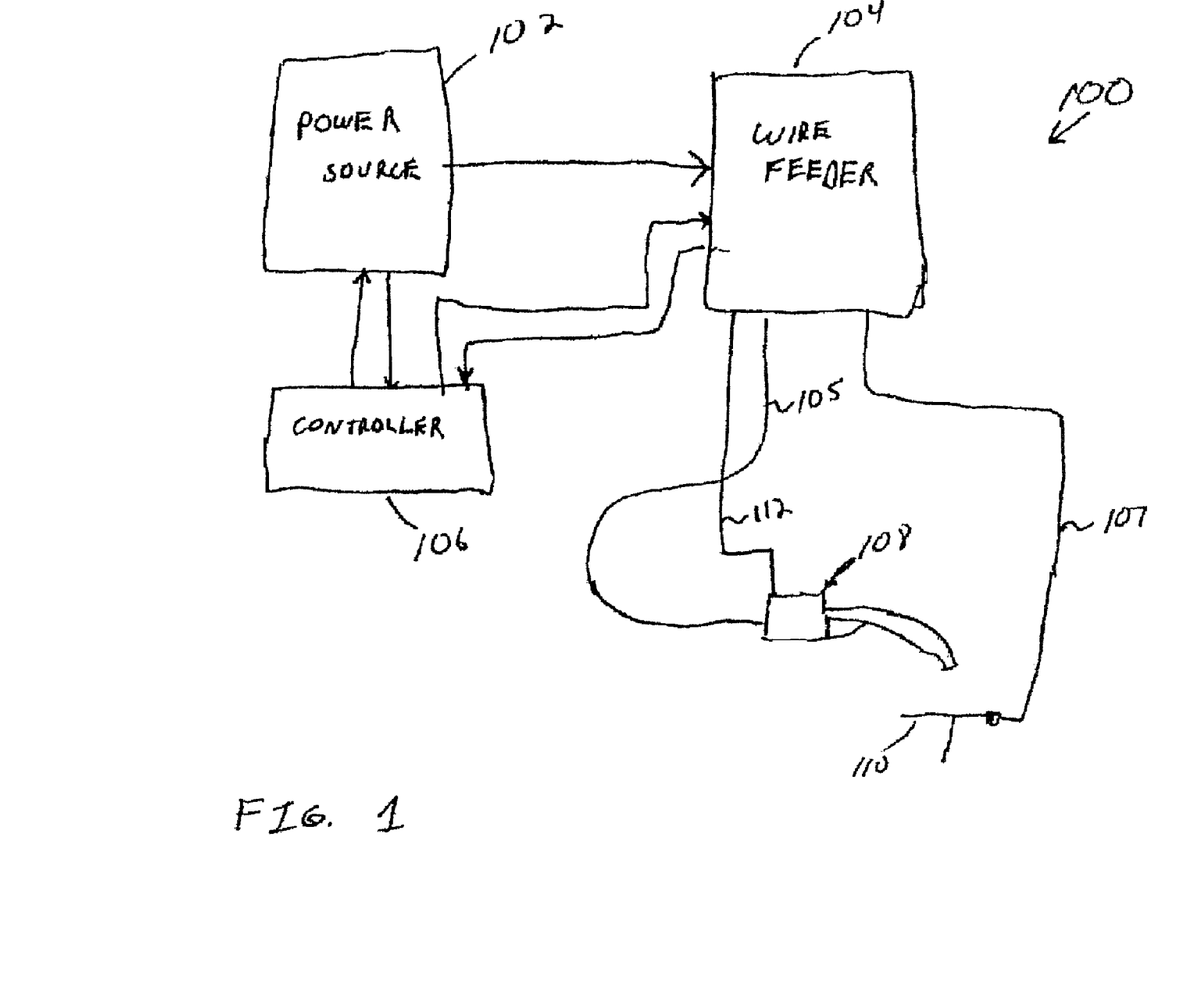
FIG. 1 is a diagram of a welding system, in accordance with the present invention.

Referring now to FIG. 1, a welding system 100 includes, in accordance with the preferred embodiment, a power supply 102, a wire feeder 104, a controller 106 and a torch 108, and a supply line 112 which feeds welding current, gas, water, control, and current for motors to torch 108, that cooperate to provide welding current on weld cables 105 and 107 to a workpiece 110. Power supply 102, wire feeder 104 and controller 106 may be commercially available welding system components, such as a Miller Invision 456® power supply, and a modified Miller XR® wire feeder. Power supply, as used herein, includes any device capable of supplying welding, plasma cutting, and/or induction heating power including resonant power supplies, quasi-resonant power supplies, etc., as well as control circuitry and other ancillary circuitry associated therewith. Power source, or source of power, as used herein, includes the power circuitry such as rectifiers, switches, transformers, SCRs, etc. that process and provide the output power. Wire feeder, as used herein, includes the motor or mechanism that drives the wire, the mounting for the wire, and controls related thereto, and associated hardware and software. It can include a motor near the source of wire that pushes the wire to the weld, and/or motor(s) near the torch that pulls the wire into the line and to the contact tip, or pulls the wire back from the contact tip. Wire path as used herein, includes the path the wire takes from the wire source to the torch or power supply, and may include through a liner, a buffer, etc.

Controller 106 is part of wire feeder 104 and power supply 102 in this embodiment. Controller 106 also includes control modules adapted for the present invention, such as a reversible wire feeder control module to control the reversible motors, a mean arc current module, and the control module for the mechanical control of the arc states. Controller, as used herein, includes digital and analog circuitry, discrete or integrated circuitry, microprocessors, DSPs, etc., and software, hardware and firmware, located on one or more boards, used to control a device such as a power supply and/or wire feeder. Control module, as used herein, may be digital or analog, and includes hardware or software, that performs a specified control function. For example, a mean arc current control module controls the output to provide a desired mean arc current.

Figure 2:
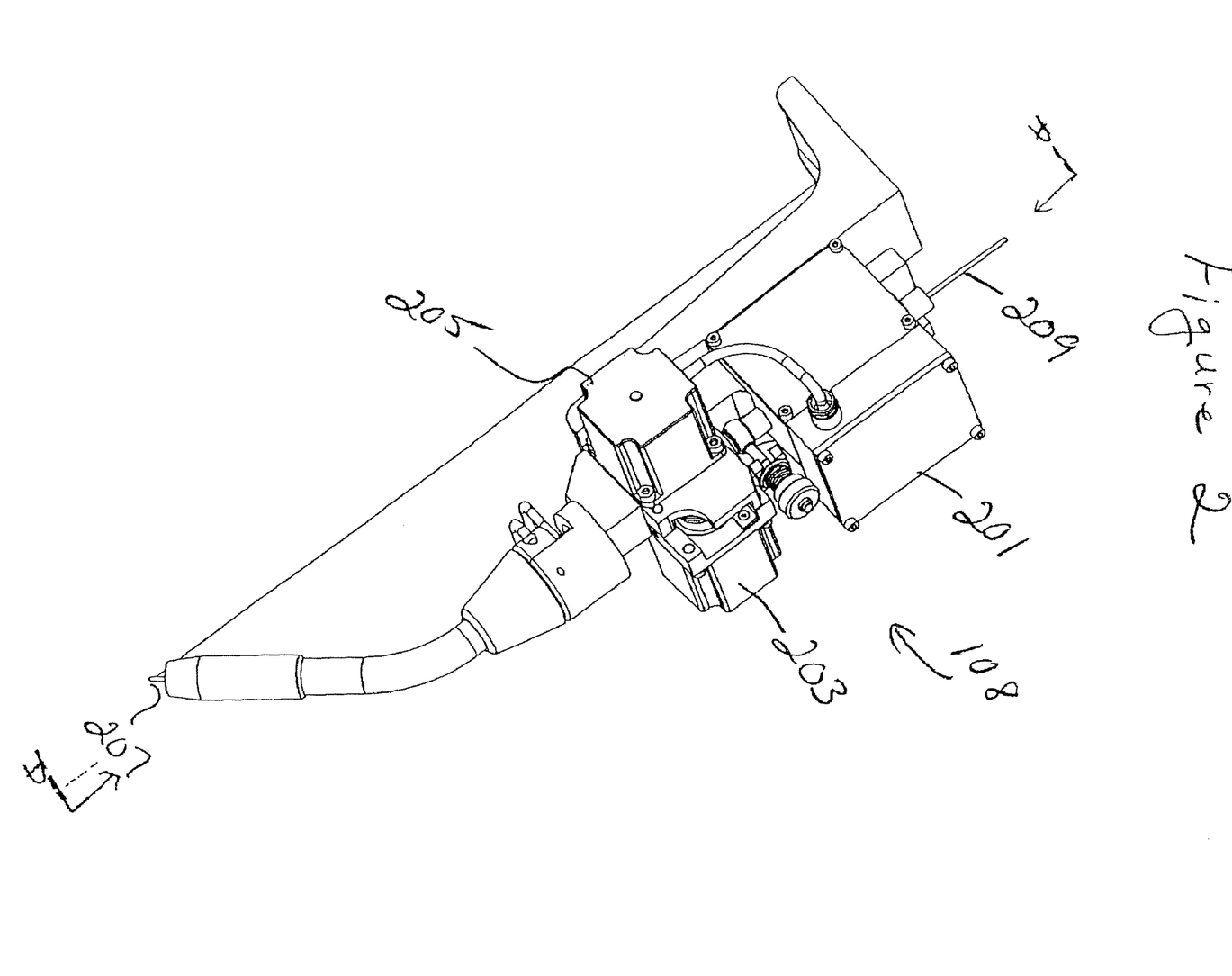
FIG. 2 is a torch with a buffer and reversible motors in accordance with the present invention.

FIG. 2 shows torch 108 in more detail. Torch 108 includes, in addition to the features of prior art torches, a pair of motor housings 203 and 205 have motors disposed within to drive the wire to or from the weld, and a buffer 201 to take up wire 209 when it is retracted, and provide wire 209 when it is advanced. Buffer, as used herein, includes components used to take up the wire when the wire direction is reversed and provide wire when the wire is advanced. The end of the wire at the arc is shown as 207. The motor housings and buffer are adjacent to the torch in the preferred embodiment, and near the torch in other embodiments. Adjacent the torch, as used herein, includes abutting, touching or part of the torch, directly or through a housing. Near the torch, as used herein, includes much closer to the torch than the source of wire, such as more than 75% of the way from the source to the torch. One embodiment provides that a handheld torch includes a small spool of wire mounted on the torch.

Figure 3:
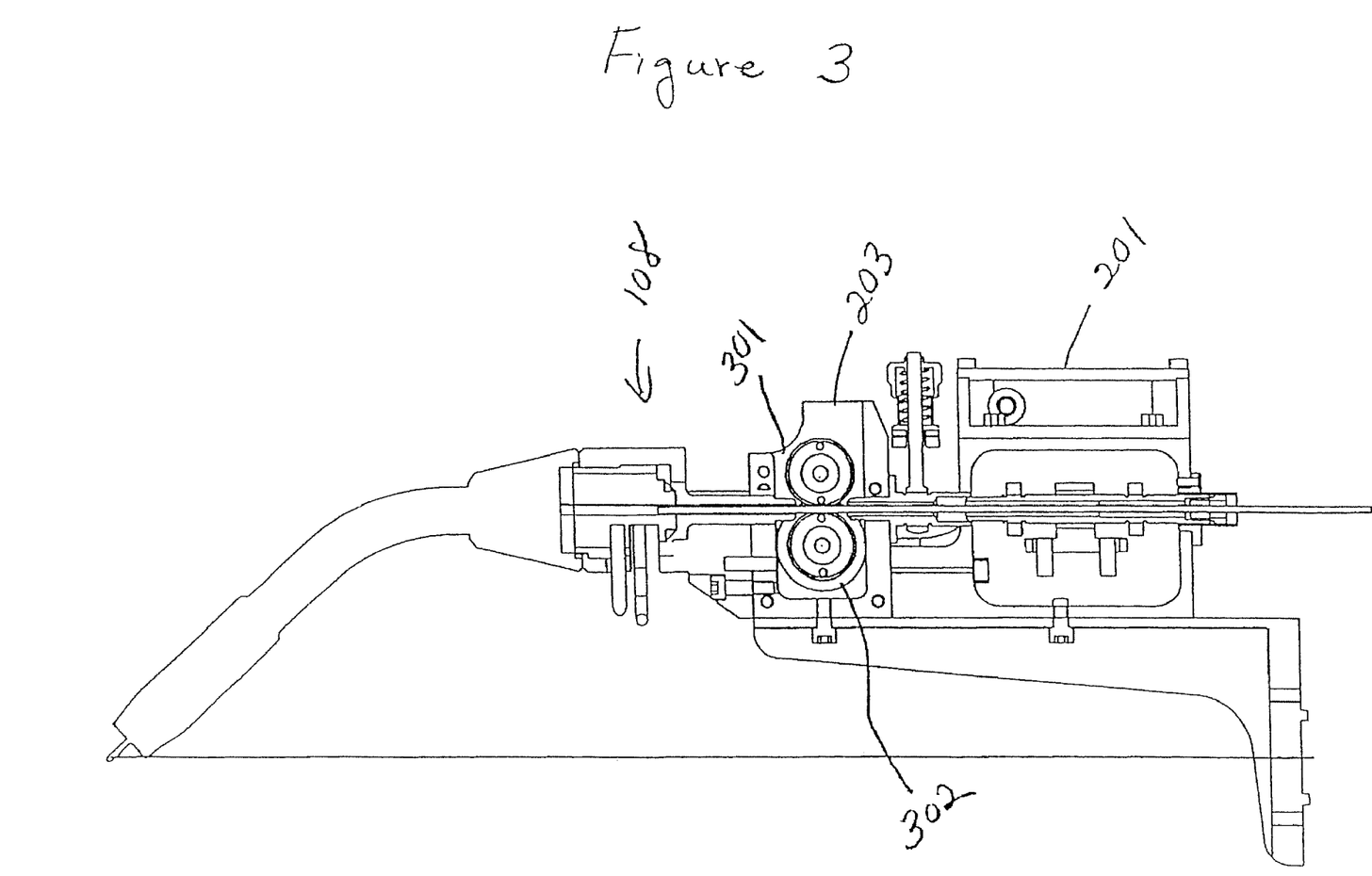
FIG. 3 is a cross-sectional view of the torch of FIG. 2.

FIG. 3 is a cross-sectional view of the torch of FIG. 2, taken along lines A-A. A pair of motors 301 and 302 are preferably stepper motors (although they may be other motors) and drive the wire and are disposed adjacent to the wire, and directly opposite one another, on opposite sides of the wire, thereby substantially equalizing forces on the wire. In alternative embodiments they are disposed one following the other, or on the same side of the wire. Directly opposite one another, as used herein, includes at substantially the same position along a wire path. Disposed adjacent the wire, as used herein, includes being close enough to the wire to push or pull the wire. Drive the wire, as used herein, includes one or both of moving the wire toward the torch and moving the wire away from the torch.

Figure 4:
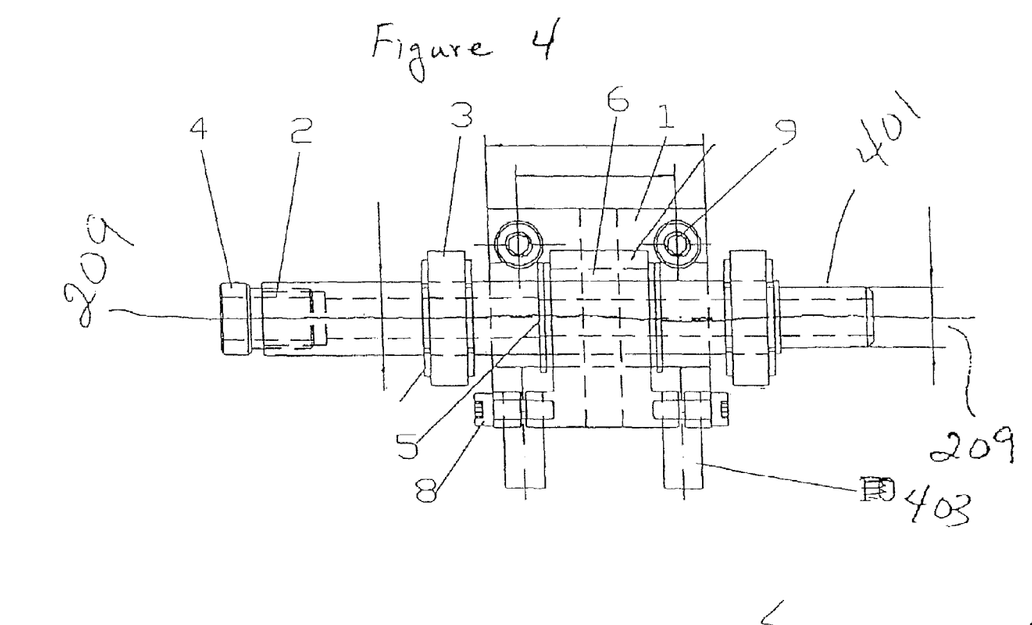
FIG. 4 is a detailed cross-sectional view of a buffer in accordance with the present invention.
Figure 5:
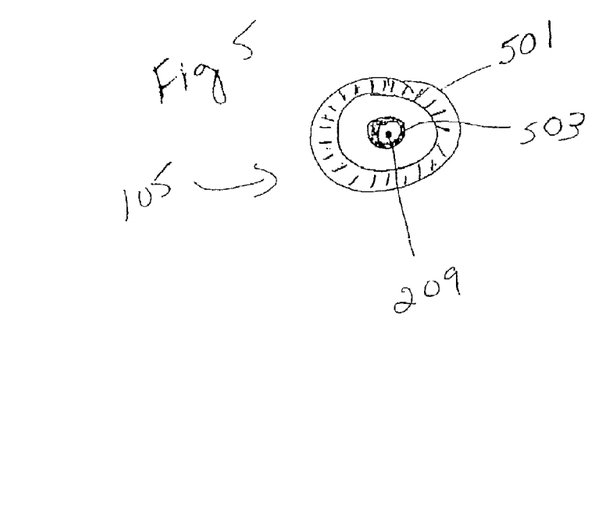
FIG. 5 is a cross-sectional view of a weld cable used as part of a buffer in accordance with the present invention.

Buffer 201 may also be seen on FIG. 3, and is shown in more detail on FIG. 4, and includes a shaft 401 mounted on a support 403. Shaft 401 has a hollow axis, through which wire 209 passes. Weld cable 105 (FIGS. 1 and 5) is comprised of an outer tube 501 and a liner 503, with wire 209 disposed therein. The outer diameter of line 503 is substantially smaller than the inner diameter of tube 501, to allow for wire length to be taken up or stored by liner 503 flexing within tube 501. Liner 503 is preferably a coil spring that allows for compression and expansion to further buffer the wire. Storing a length of wire, as used herein, includes taking up wire when the wire direction is reversed. Substantially more than an outer diameter of the liner, as used herein includes enough room to move and flex. Wire liner, as used herein, includes a tube in which the wire can easily move. Tube 501 is mounted to shaft 401 so that wire 209 moves with respect to shaft 401.

A sensor can be included that senses the amount of wire taken up by buffer 201. Examples of such sensors include a wheel with an encoder that is turned as the wire moves past it, or a linear transformer, with the liner being comprised of a ferrite or magnetic material. The controller includes a buffer feedback input that receives the feedback, and provides a wire feed motor output that is responsive to the buffer feedback. Tension in the wire can also be sensed and used to control the process.

Control of the process from an electrical standpoint is easier since process control is performed using mechanical control of the wire position. Therefore, the welding current becomes an independent process parameter, totally opposite to the conventional MIG process.

One desirable control scheme uses mean arc current (average current during the arc state, or a function thereof) as the control variable. This allows better control of the melting and heat to the weld, and reduces spatter and instability, compared to prior art control schemes. It is possible to use mean arc current to control the heat, since arc current is not used to cause the transition from arc to short (or the opposite). The control of the states can be coordinated with the current control. For example, if a state transition is to occur at a time T1, the current transition can occur shortly before that, so as to avoid disrupting the weld pool. Another control feature is to allow the user to set relative arc and short time, or balance between EP and EN.

Figure 6:
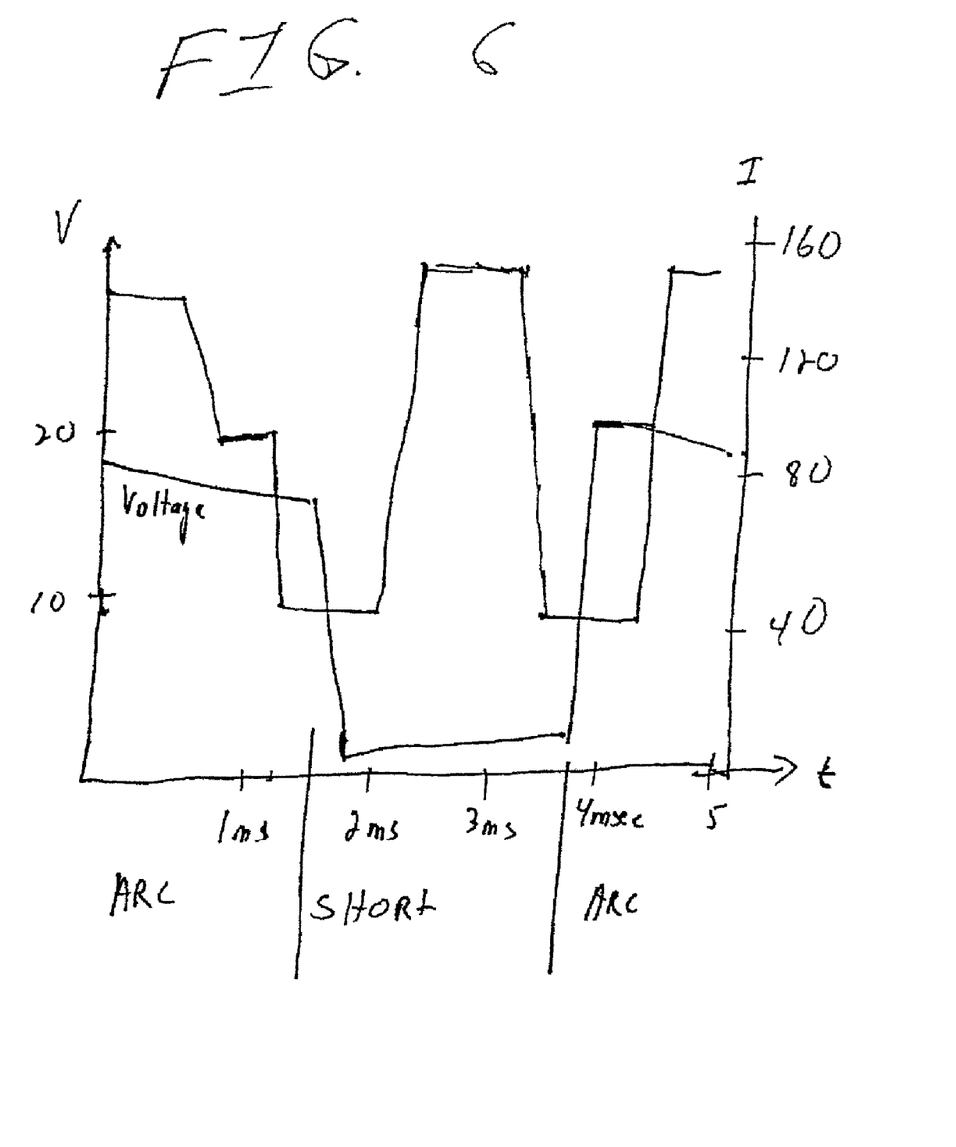
FIG. 6 is a wave form of a process cycle in accordance with the preferred embodiment.

One desirable arc waveform is shown in FIG. 6, and includes an arc current waveform with three segments—an initial high current segment, an intermediate current segment, and a low current segment. The low current segment is entered into prior to the short forming, thereby enhancing a smooth transition to the short circuit state.

Because the welding current becomes an independent process parameter, the current can be set to the value, which directs the process into the wanted situation by physical determined behavior. For a low spatter material transfer, the forces onto the liquid have to be low, when the cross section of the electrical conductor is low. Therefore, the currents have to be low during those phases. During the middle part of the short circuit state, where larger cross section of the electrical conductor is present, high forces can be used to move liquids. Also, high currents during the middle part of the short circuit state are possible. During the arc phase, the current can be used for movement of the liquid and determining the melting rate.

The present invention may be used with known control schemes, but implement them in a more desirable fashion by eliminating the need for current levels to cause transitions. For example, schemes using either arc length or stick-out as a control variable can be implemented, easily because the stepper motors allow stick-out to be measured precisely. Because the transitions are caused mechanically, the arc length may be redetermined each process cycle.

The present invention may be implemented with a variety of processes, including but not limited to electrode positive, electrode negative, alternating polarity, ac mig, mig brazing, hard facing, and welding with thick wire at low currents. For example, welding on a 2.4 mm wire may be performed at 100 amps, or even 35 or fewer amps with the present invention. Prior art systems required more current on thick wire to cause the short to clear and to enter the arc state. The present invention doesn't rely on current to clear the short, so thick wire and low current may be used.

The control preferably ties the speed of the wire feed motor to the average speed of the stepper motors, so that the wire feed speed follows the process speed. Averaging speed over 20-30 process cycles (about 500 msec.) provides for effective control.

Pool oscillation frequency can be found by monitoring the distance the wire travels until a short is created, or an arc is created. One control scheme provides that the state transitions are timed to coincide with the natural frequency of pool oscillation. The controller includes a frequency module and a pool oscillation feedback circuit that effect this control scheme. A short detection feedback circuit may be used as part of the control loop.

Numerous modifications may be made to the present invention which still fall within the intended scope hereof. Thus, it should be apparent that there has been provided in accordance with the present invention a method and apparatus for controlled short circuit welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the claims.

The embodiments of the invention in which an exclusive property or privilege is claimed are defined as follows:

1. A welding-type power source, comprising:
   a wire feeder disposed to provide wire to an arc;
   a power supply disposed to provide power to the arc;
   a second wire feed motor, disposed to move the wire to the arc and to cause the process to change states;
   a controller, connected to the power supply and the wire feeder, and including a second wire feeder control module connected to the second wire feeder and, wherein the second wire feeder control module includes a second motor output having a value determined at a frequency of at least once per process cycle; and
   a short detection feedback circuit, providing an input to the controller.

2. The welding-type power source of claim 1, wherein the wire feeder includes a wire feed motor for moving the wire to the arc, and the second motor is further disposed to superimpose movement of the wire onto the movement from the wire feed motor, wherein the controller includes a wire feed motor output slaved to an average of the second motor output.

3. The welding-type power source of claim 2, including a buffer disposed between the wire feed motor and the second motor, wherein the controller includes a buffer feedback module and the wire feed motor output is responsive to the buffer feedback module.

4. The welding-type power source of claim 1:
   wherein the wire feeder includes a wire feed motor for moving the wire to the arc;
   wherein the second wire feed motor is further disposed to superimpose movement of the wire onto the movement from the wire feed motor;
   a buffer disposed between the wire feed motor and the second wire feed motor; and
   wherein the controller includes a buffer feedback module and a wire feed motor output responsive to the buffer feedback module.

5. The welding-type power source of claim 1, wherein the second motor is a stepper motor, whereby the second motor incrementally turns in a series of steps having a given angle.

6. The welding-type power source of claim 5 wherein the controller includes a step size output and the given angle is varied in response to the step size output.

7. The welding-type power source of claim 1, where the controller includes a frequency module, and the frequency module is responsive to at least one control parameter.

8. The welding-type power source of claim 1, including a pool oscillation feedback circuit connected to the controller.

9. A welding-type power source, comprising:
   a wire feeder disposed to provide wire to an arc;
   a power supply disposed to provide power to the arc;
   a second wire feed motor, disposed to move the wire to the arc and to cause the process to change states;
   a controller, connected to the wire feeder, and including a second wire feeder control module connected to the second wire feeder and, wherein the second wire feeder control module includes a second motor output, and including a mean arc current control module having an arc current control output responsive to mean arc current and connected to the power supply; and
   a short detection feedback circuit, providing an input to the controller.

10. The welding-type power source of claim 9:
    wherein the wire feeder includes a wire feed motor for moving the wire to the arc;
    wherein the second motor is further disposed to superimpose movement of the wire onto the movement from the wire feed motor;
    a buffer disposed between the wire feed motor and the second motor; and
    wherein the controller includes a buffer feedback module and a wire feed motor output responsive to the buffer feedback module.

11. A welding-type power source, comprising:
a wire feeder disposed to provide wire to an arc;
a power supply disposed to provide power to the arc;
a second wire feed motor, disposed to move the wire to the arc and to cause the process to change states;
a controller, connected to the power supply and the wire feeder, and including a second wire feeder control module connected to the second wire feeder and, wherein the second wire feeder control module includes a second motor output; and
a short detection feedback circuit, providing an input to the controller.

12. The welding-type power source of claim 11, wherein the wire feeder includes a wire feed motor for moving the wire to the arc, and the second motor is further disposed to superimpose movement of the wire onto the movement from the wire feed motor, wherein the controller includes a wire feed motor output slaved to an average of the second motor output.

13. The welding-type power source of claim 12, including a buffer disposed between the wire feed motor and the second motor, wherein the controller includes a buffer feedback module and the wire feed motor output is responsive to the buffer feedback module.

14. The welding-type power source of claim 13, wherein the second motor is a step motor, whereby the motor incrementally turns in a series of steps having a given angle.

15. A welding-type power source, comprising:
a wire feeder, including a wire feed motor for moving the wire to the arc, disposed to provide wire to an arc;
a power supply disposed to provide power to the arc;
a second wire feed motor, disposed to move the wire to the arc whereby movement of the wire is superimposed onto the movement of the wire from the wire feed motor and causes the process to change states;
a controller, connected to the power supply, and including a second wire motor output connected to the second wire feeder and, including a wire feed motor output slaved to an average of the second motor output.

16. The welding-type power source of claim 15, including a buffer disposed between the wire feed motor and the second motor, wherein the controller includes a buffer feedback module and the wire feed motor output is further responsive to the buffer feedback module.

17. The welding-type power source of claim 15, including a pool oscillation feedback circuit connected to the controller.

* * * * *